United States Patent Office 3,200,470
Patented Aug. 17, 1965

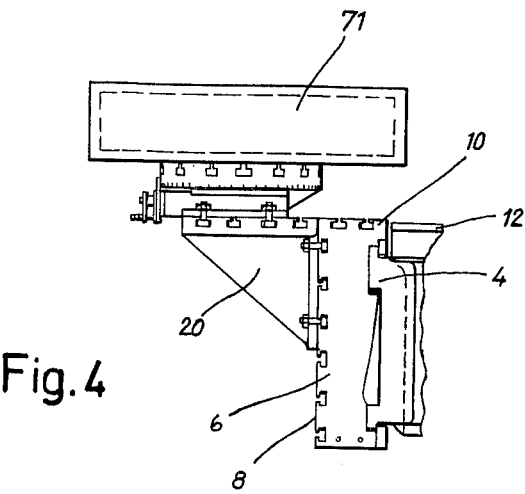
Fig. 4
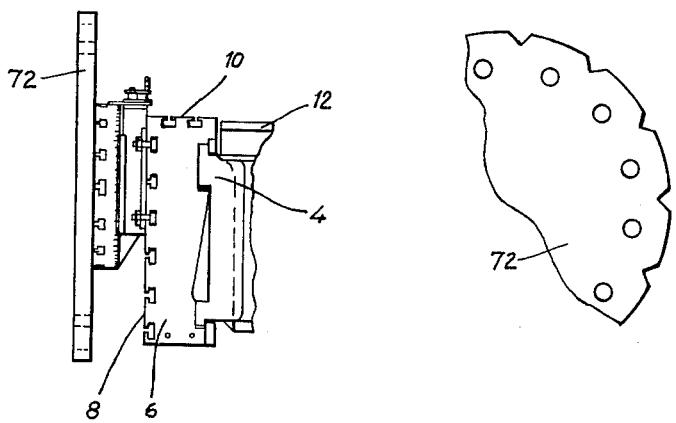
Fig. 5
Fig. 6

3,200,470
MACHINE TOOL
Johann Müller, Munich, Germany, assignor to Hans Deckel, Munchen, Germany, and Friedrich Wilhelm Deckel, Zug, Switzerland
Filed July 30, 1962, Ser. No. 213,480
Claims priority, application Germany, Aug. 4, 1961,
D 36,740
8 Claims. (Cl. 29—26)

The present invention relates to improvements in machine tools and particularly to a combination boring, drilling, and milling machine.

An object of the invention is the provision of a generally improved and more satisfactory machine tool, and especially one which is in the nature of a "universal" tool so far as milling, drilling, and boring are concerned, capable of accurate and efficient performance of a greater variety of work operations than has been possible with prior machines.

Another object of the invention is to provide a machine having a machine bed and a work table and spindle head mounted on the bed for relative movement to each other for supporting a work piece on the work table and a cutting tool on the spindle head, so that precision cutting operations may be performed on the work piece including drilling, boring, and milling operations.

Still another object of the invention is to provide a machine having a machine bed, a work table, a column and a spindle head in which the column and work table are movable on the machine bed relative to each other and the spindle head is movable on the column relative to the machine bed and work table for performing precision boring, drilling, milling and other machining operations on work carried by the work table by a tool carried on the spindle head.

A further object of the invention is to slidably mount a column on a machine bed for movement toward and from a work table slidably mounted on the front side wall of the machine bed with a suitable cutting tool adjustably mounted on the column so that a work piece mounted on the work table can be machined by either a boring, drilling, or milling operation in which the cutting tool can be mounted in close proximity to the column with the work positioned on the work table adjacent to or overlying the machine bed in order to eliminate bending of the machine parts for obtaining higher precision in the combined cutting operations performed by the machine.

A still further object of the invention is to provide a machine on which several different types of machining the top side of a machine bed toward and from a work table mounted on another side of the machine bed for slidable movement in angular relation to the column to provide a rigid support for the work on the work table by supporting it adjacent to the machine bed while the cutting tools may be mounted on the column for relative movement to work on the work table with the column movable toward and from the work along the top of the machine bed for eliminating clearance of the work table and the column on the machine bed and bending or flexing of the work table and column during machining operations.

A still further object of the invention is to provide a machine on which several different types of machining operations can be performed with high precision in which a column is slidably mounted on guideways on opposite sides of the top surface of a machine bed, a work table is slidably mounted on the front side of the machine bed and the top portion of the machine bed formed with a trough between the guides for the column so that cutting tools adjustably mounted on the column may be moved into the trough in the machine bed below the guideways and top surface of the work table at opposite sides of the machine bed in order to produce machining operations on work carried by the work table from below the bottom surface to above the top surface thereof.

Another object of the invention is to provide a machine bed with horizontal guides on one side slidably supporting a work table provided with work supporting means on both the side and top surfaces thereof; a pair of spaced horizontal guideways on the top of said machine bed slidably mounting a column for movement toward and away from the work table; a spindle head movably mounted on a side face of the column facing the work table for supporting cutting tools for producing machining operations on work supported on one or both sides of the work table; and controls for operating the work table, the column and the spindle head relative to one another on the machine bed mounted on the side of the machine bed, column and spindle head adjacent to the work table so an operator may conveniently control and operate the work table, the column and the spindle head in a convenient manner to produce boring, drilling, and milling operations on work carried by the work table while visually watching the operation.

Another object of the invention is to provide a machine having a machine bed formed with horizontal guideways for slidably mounting a work table on one side thereof in which the portion of the machine bed below the guideways is recessed so the guideways and work table extend beyond one side of the bottom portion of the machine bed to an extent sufficient that a tray may be mounted below the work table and horizontal guideways on the machine bed for receiving chips and coolant resulting from machining operations.

Another object of the invention resides in providing a machine having a machine bed formed with spaced guideways on the top wall; spaced guideways on one side wall extending in angular relation to the guideways on the top wall; a work table slidably mounted on the guideways on the side wall; a trough formed in the top wall of the machine bed between the guideways inclining downwardly toward the guideways on the side wall thereof and having an opening adjacent to the guideways on the sidewall extending downwardly for discharge of chips and coolant; and a tray mounted on an overhanging portion of the machine bed below the opening from the trough, the guideways on the side of the machine and the work table.

Still another object of the invention resides in providing a machine bed; a column slidable on the top wall thereof; a spindle head movably mounted on one side wall of the column over a work table slidably mounted on one side of the machine bed; and a turret type head mounted on the top of the column having one or more radial arms extending beyond the sides of the column for carrying a counter support, a slotter, a vertical milling head, grinding head or the like, on the free end of the arms for movement into position adjacent to the spindle head for either attachment thereto or cooperation therewith in performing machining operations on work mounted on the work table.

A still further object of the invention is to provide a machine having a work table provided with vertical and horizontal surfaces in which the top portion and the horizontal surface of the work table extend above the guides on the machine base so auxiliary work supports may be attached to either the top or side portions of the work table and a rotatable auxiliary work support may be applied either to the top or side surfaces of the work table for supporting work to be machined on any of the several sides thereof according to the adjustment of the work table. The work table is so constructed and arranged with respect to the bed and the column mounted thereon that the work may be supported so it will overhang the sides of the work table on which it is supported whether in a horizontal position or a substantially vertical position in order to position the work for machining operations so bending stresses may be eliminated and greater precision of machining operations obtained.

These and other desirable objects may be attained in the manner disclosed as an illustrative embodiment of the invention in the following description and in the accompanying drawings forming a part hereof, in which:

FIG. 4 is a fragmentary view showing the work table in end elevation having an angular auxiliary table mounted thereon carrying a rotatable circular auxiliary table so the work piece may be adjusted into a plurality of different positions by a movement of the circular work table for machining operations thereon without rechucking the work piece on the work table;

FIG. 5 is another fragmentary view showing an end elevation of the work table with a circular rotary auxiliary table mounted on the vertical surface of the work table and carrying an indexing disk arranged for adjustment so the marginal portion of the indexing disk can have different machining operations performed thereon; and FIG. 6 is a fragmentary view showing one side portion of the indexing disk after the machining operations thereon have been completed.

The present invention is an improvement over machines of the character shown in U.S. Patents Nos. 2,703,510 issued March 8, 1955; 2,806,390 issued September 17, 1957; 2,851,910 issued September 16, 1958; 2,891,452 issued June 23, 1959; and 2,929,300 issued March 22, 1960.

Figure 1:
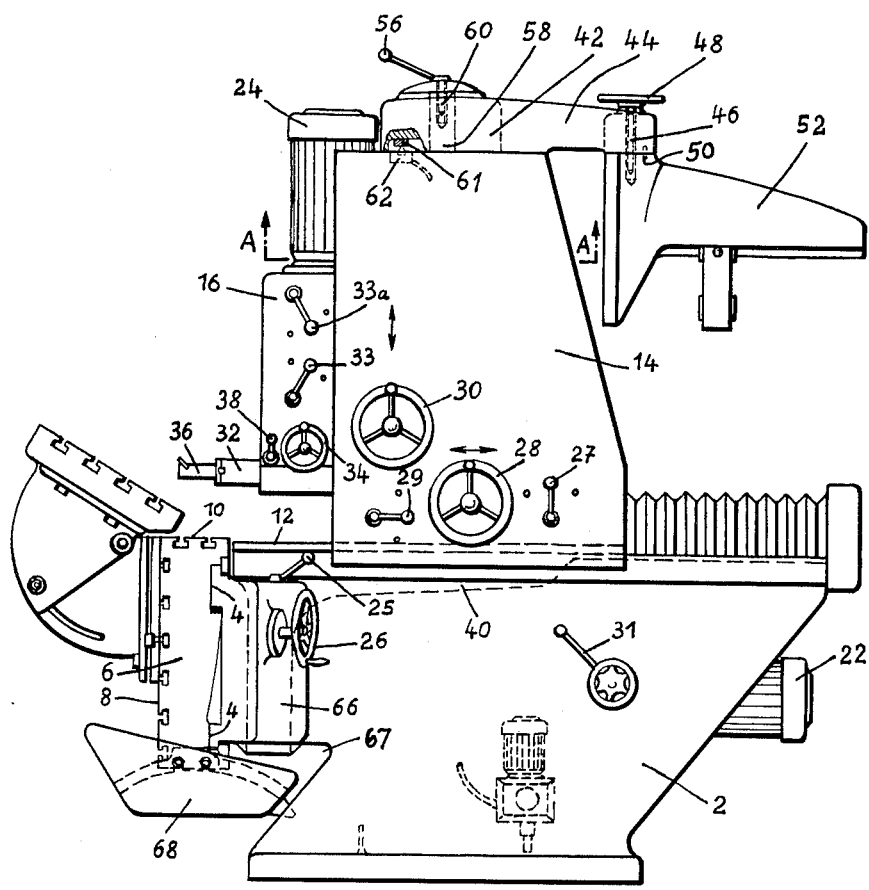
FIG. 1 is a side elevation of the machine with a swivel table arranged on the vertical clamping surface of the work table.
Figure 2:
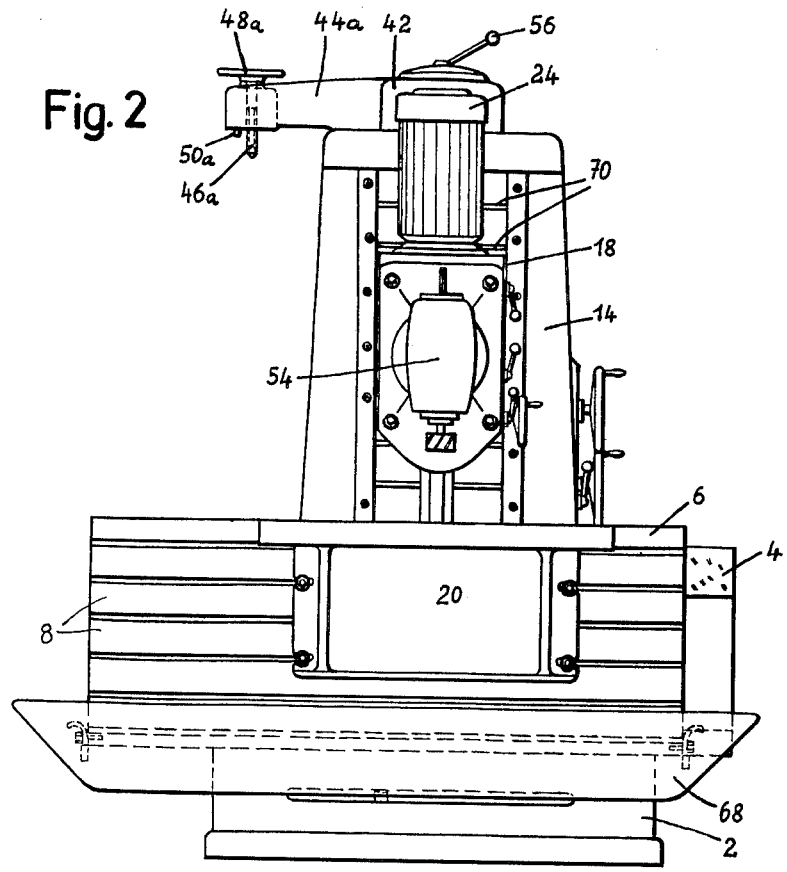
FIG. 2 is a front view of the machine with a vertical spindle attachment applied to the spindle head and an auxiliary work support applied to the work table.

A combination milling, drilling, and boring machine is shown in FIGS. 1 and 2 of the present drawings. This combination machine has a machine bed 2 formed with a pair of spaced parallel horizontal guides 4 on the front side thereof, as shown in FIG. 1, in which the bottom portion of the machine bed below the guides 4 has the front wall portion notched or offset rearwardly of the guides to provide a recess 67 across the front of the machine for accommodating the rear edge of a chip box 68 as described below. A work table 6 is slidably mounted on the horizontal guides 4 in vertically extending relation for slidable movement back and forth in horizontal relation across the front of the machine bed 2. The outer or front surface 8 of the work table 6 has a plurality of horizontal channels of the conventional undercut T-shape as clearly seen in FIG. 1, thus providing the clamping surface 8 extending in substantially vertical relation on the front outer vertical side of the work table. The upper end of the work table is similarly provided with a horizontal clamping surface 10.

The top portion of the machine bed 2 or the top wall thereof is formed with a pair of spaced parallel guideways 12 extending from the front to the rear thereof in substantially horizontal relation and substantially at right angles to the side horizontal guideways 4. The guideways 12 are formed at opposite sides of the central portion of the machine bed 2 along the side edges thereof and extend above the top wall surface. The horizontal clamping surface 10 on the upper end of the work table 6 is arranged to lie in a horizontal plane above the upper surfaces or edges of the guideways 12 for a purpose to be hereinafter described.

Figure 3:
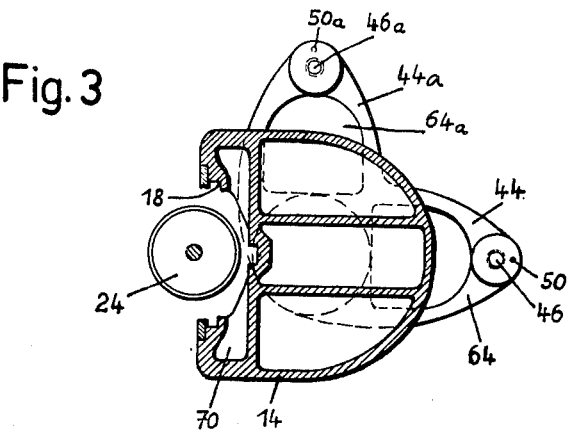
FIG. 3 is a horizontal transverse cross section taken substantially on the line A—A in FIG. 1.

A column 14 has a bottom portion formed with guideways complementary to the guideways 12 slidably mounting the column on the machine bed 2 for movement between the front and rear ends thereof. The column 14 is formed with a plurality of substantially vertically extending wall portions arranged in angular relation to each other as shown in FIG. 3 joined along their marginal portions to form a substantially rigid inflexible support. The front side wall of the column 14 has spaced angular sections extending vertically along the side edges of the column to provide vertical guideways 18 for the spindle head 16. The spindle head 16 is mounted for vertical sliding movement along the front side of the column 14, as shown in FIGS. 1 and 3, and may be moved into alined relation over the work table 6 and a work piece mounted thereon according to the position of the column 14 on the machine bed 2.

The movements of the work table 6 and the column 14 on the machine bed 2 and the movement of the spindle head 16 on the column 14 may be obtained by manual operation of suitable conventional mechanical means, such as bevel gearing and feed screws or the like, having portions mounted in the machine bed 2 and connected with the work tabe 6, the column 14 and the spindle head 16, respectively. A motor 22 mounted on the machine bed 2 is provided for power operation of conventional mechanical feed means for adjusting or moving the work table 6 along its guideway 4, the column 14 on its guideway 12 on the machine bed, and the spindle head 16 on its guideway 18 on the column 14.

The manual or motor driven operation of the work table 6 on the machine bed 2 is obtained by operating a control lever or switch 25 into any of three positions. A central position of the control lever 25 provides for manual operation and feed of the work table 6 along its guideway 4 through manual rotation of the hand wheel 26 in either direction. Positioning the control 25 to right or left of its central position causes the motor 22 to feed the work table 6 in one direction or the other. Similarly, a central position of the switch or control lever 27 mounted on a side wall of the column 14, see FIG. 1, enables forward or rearward movement of the column 14 along the guideways 12 through manual operation of the hand wheel 28. The control lever 27 may also be moved left or right from its central position, to shift a conventional form of gear shifting mechanism for securing power operation of the column 14 on the guideways 12 by the motor 22, to move the column 14 toward or from the front end of the machine bed 2.

The control lever 29 is manually operable on the side of column 14, as shown in FIG. 1, for controlling the conventional drive mechanism to secure up and down vertical movement of the spindle head 16 on the guideway 18 of the column 14. In a central position of the control lever 29, the spindle head is moved through manual operation of the hand wheel 30. Movement of the lever 29 up or down from its central position provides for upward or downward movement of the spindle head 16 by the motor 22. The control lever 31 mounted on the side of the machine bed 2, as shown in FIG. 1, is manually operable to adjust in a conventional way the speed of feeding movement of the work table 6, the column 14, and the spindle head 16, as the case may be, when driven from the motor 22.

The motor 24 mounted on the upper end of the spindle head 16 drives suitable conventional gear mechanism contained in the spindle head for operating the horizontal milling and boring spindle 32 rotatably mounted in transversely extending relation in the lower portion of the spindle head 16, as shown in FIG. 1, and also capable of a forward and rearward feeding movement relative to the head 16. When desired, the spindle 32 may carry a boring bar 36 fastened by means of a self-locking taper on one with a pull rod. The outward and inward feeding motion of the spindle can be effected mechanically from the motor 24, or manually from the hand wheel 34, the type of feed, and its direction when the power feed is used, being determined by the setting of the three-position control lever 38, similar to the other feed control levers 25, 27, and 29.

The control levers 33 and 33a respectively are manually operable into any one of a plurality of different positions for shifting conventional gear mechanism within the spindle head 16 in a manner well known in the art for controlling the speed of rotation of the boring spindle 32 and the tool 36, and the speed of outward or inward feeding movement of the spindle 32 when the control lever 38 is shifted out of its central position into position for securing power driven operation of the spindle feed by the motor 24.

A plurality of auxiliary work tables of different types may be used with the work table 6. For example, an angularly adjustable work table may be mounted on the upright or vertical clamping surface 8 of the work table 6, as shown in FIG. 1, with the work surface thereof adjustable into angular positions relative to the vertical and horizontal faces 8 and 10 of the work table 6 for supporting work to be machined by cutting tools mounted on the spindle head 16. An auxiliary work table 20, as shown in FIGS. 2 and 4, may be mounted on the vertical work surface 8 and provided with a horizontal work surface alined with the work surface 10 on the work table 6 for cooperation therewith in supporting work in a horizontal position on the top portion of the work table.

An auxiliary rotary work table may be mounted on the horizontal working surface of the work table 6 either on the upper work surface 10 or the work surface of the bracket 20 or auxiliary work table forming an extension thereof, as shown in FIG. 4, or, the auxiliary rotary work table may be mounted on the vertical work surface 8, as shown in FIG. 5. A work piece 71, such as a gear box, may be mounted and suitably secured to the rotatable portion of the work table, as shown in FIG. 4, by suitable chucks or other conventional attaching members with the marginal portions of the bottom of the workpiece 71 overhanging the sides of the rotatable circular work table, as well as the bracket 20 and the work table 6, in the manner shown in FIG. 4. With this arrangement of the workpiece 71, machining operations may be performed on the top, the several sides and the outer marginal portions of the bottom thereof by either boring, drilling, or milling tools, or other suitable cutting tools mounted on the spindle head 16. A work piece 72 may be mounted on the circular work table, as shown in FIG. 5, in a vertical position. The work piece 72, as illustrated in FIG. 5, is in the form of a disk adapted to be machined to form an indexing disk in which a plurality of holes may be drilled or bored therein and the marginal portion notched by a milling operation to form a construction, as illustrated in FIG. 6.

In performing the various machining operations on the work pieces 71 or 72, as shown in FIGS. 4, 5, and 6, it will be understood that for each operation, whether it be for a drilling, boring, milling, or other operation, the workpiece is rigidly held in position on the work table 6 by the means of, and in cooperation with, the auxiliary work tables carried thereby, for obtaining precision machining operations on the workpiece without removing the workpiece from the work table and its connected auxiliary work table attachments.

The horizontal spindle 32 carries the usual conventional attaching means for either a boring, drilling or milling tool, so the desired tool may be detachably and rigidly mounted on the end of the spindle 32. Grinding and other types of tools used on machines of this general character may also be used on the spindle 32 for desired types of machining operations on work pieces mounted on the work table 6 either with or without one or more of the auxiliary work table attachments. A slotter or vertical milling head 54 as shown in FIG. 2 may be mounted on the front face of the sipndle head 16, and its vertical spindle may be driven in known manner from a gear wheel mounted on the horizontal spindle 32, meshing with and driving the known gear means arranged in the attached auxiliary spindle head 54 to drive the vertical shaft in the head 54.

It will be noted that all of the control levers and the hand wheels hereinabove described and shown in FIG. 1, are mounted on one side of the machine to be accessible by the machine operator for conveniently controlling the movement of the work table, the column 14, the spindle head and the spindle 32 relative to one another, either manually, or by power operaton thereof, through having the various control levers and the hand wheels arranged in a convenient location for the operator located at the side of the machine shown in FIG. 1. In this way the machine operator may observe the operation of the tools mounted on the spindle head while having the controls for the various parts of the machine readily accessible for operation when desired.

A rotatable head or turret-like head 42 has the hub portion rotatably mounted on a post 58 extending upwardly from the top wall of the column 14, as shown in FIG. 1. A locking screw 60 is operated by a hand lever 56 so the rotatable head 42 may be locked in adjusted position by manually operating the lever 56 to tighten the screw 60 to secure the head 42 against the top wall of the column 14. The rotatable or turret-like head 42 has a pair of radial bracket arms 44 and 44a, as shown in FIGS. 1 to 3, extending outwardly therefrom in angular relation beyond the sides of the column 14.

The outer ends of the arms 44 and 44a carry securing screws 46 and 46a respectively, operated by the hand wheels 48 and 48a respectively, for detachably mounting various types of tools on the ends of the arms. For example, a counter support 52 may be mounted on the outer end of the arm 44, as shown in FIG. 1, by means of the screw 46 rigidly securing it thereto in suspended relation below the end of the arm. A locating pin 50 mounted in the end of the arm adjacent to the screw 46 holds the counter support 52 in position on the arm 44. A similar locating pin 50a is provided on the arm 44a for locating a tool of a suitable character thereon. The arms 44 and 44a of the rotatable head 42 are provided for mounting a counter support 52 thereon, as shown in FIG. 1, or a slotter, a vertical milling head, such as the milling head 54 shown in FIG. 2, a universal milling head which can be swung into any desired position, a grinding head or other suitable head containing a milling, drilling, or boring tool or any other tool of a desired character.

The rotatable or turret-like head 42 is adapted to be rotated from the position shown in FIGS. 1 and 3, by loosening the screw 60 through the operation of the hand lever 56 to move the tool carried by one of the arms thereof in a position in front of the spindle head 16. For example, the counter support 52 may be moved into a position in front of the spindle head 16, provided the spindle head 16 has been moved downwardly to an extent sufficient to position the upper end of the motor 24 below the horizontal plane of the upper end of the column 14. When the rotatable head 42 has moved the counter support 52 into position in front of the spindle head 16 or to the left thereof, as shown in FIG. 1, the inner face of the counter support 52 will move into substantial engagement with the front face of the spindle head 16 at the left hand side thereof.

The bracket arms 44 and 44a are formed with apertures 64 and 64a respectively, see FIG. 3, of a size to accommodate the motor 24 when the selected arm 44 or 44a is positioned over the motor 24. With the rotatable head 42 positioned with the arm 44 over the motor 24, and the counter support 52 in position adjacent to the outer face of the spindle head 16, the spindle head 16 may be moved upwardly to the desired position. The motor 24 will extend through the aperture 64 in the arm 44 so that the counter support 52 may be attached to the spindle head 16. The counter support 52 provides a bearing support for a tool arbor, not shown, in cooperation with the spindle head 16, to support a milling, grinding or other suitable machining tool at opposite sides of the cutting surface of the tool to provide a substantially rigid support for the tool during its cutting operation. For this purpose, the counter support 52 when attached to the spindle head 16 may then be disconnected from the radial bracket arm 44 by operating the hand wheel 48 to unscrew the screw 46 from the counter support. When this operation is completed the spindle head may be moved with the counter support and the tool supported thereby to perform the desired machining operation on work mounted on the work table, or on the work table 6 in combination with one of the auxiliary work tables.

The rotatable or turret-like head 42 has a recess formed in the bottom surface thereof, as shown in FIG. 1, for mounting a contact rail 61 which actuates a limit switch 62 mounted in the top wall of the column 14. The limit switch 62 is mounted in position to engage the contact rail 61 to close the switch only when the rotatable head is swung into a position in which the bracket arms 44 and 44a are parallel to or at right angles to the table guideway 4. In two of such positions, the large opening 64 or 64a will be aligned with the motor 24 so that movement of the motor up and down can occur without damage. In the other two positions, the arms 44 and 44a are completely away from the path of travel of the motor. The limit switch is in series with or otherwise operatively connected to the control circuit of the motor 22 so as to prevent operation of the feed motor in any position where upward movement of the spindle head with the motor 24 would cause the motor 24 to engage either of the bracket arms 44 or 44a. This provides a safety factor for preventing damage to the motor 24 or the rotatable turret-like head 42. The turret head 42 must be turned only when the spindle head 16 has been lowered sufficiently to bring the top of the motor 24 below the elevation of the top of the column 14. If the position of the work piece on the work table prevents the necessary amount of lowering of the spindle head, the entire column 14 may first be moved rearwardly along its guideways 12, until there is enough room to lower the spindle head 16 far enough to permit the rotation of the turret head.

When it is desired to remove from the spindle head 16 the counter support 52 or any other attachment which has been placed with the aid of the turret head, the reverse operation is performed. It will be understood that any desired form of attachment or tool to be used with the spindle head 16 may be mounted on one of the bracket arms 44 or 44a and selectively used with and applied to the spindle head 16 in the manner described above.

A chip box or tray 68 is mounted on and suspended below the lower end of the work table 6, as shown in FIGS. 1 and 2, and has the sides extending both rearwardly and forwardly on opposite sides of the work table 6 so that the rear side will extend under the opening or channel 66 in the machine bed 2, space or clearance being provided by the notch 67 in the bed. The front side will extend outwardly beyond the front face 8 of the work table 2 for receiving chips and cuttings as well as coolant resulting from the operation of the machine. The tray 68 extends beyond opposite ends of the work table 6, as shown in FIG. 2, and is arranged to catch the chips and cooling or lubricating fluid used in machining operations on the work supported on the work table in all positions of the work and the work table relative to the machine bed 2. Any chips and cooling or lubricating fluid which are deposited on the top of the machine bed 2 will normally fall between the horizontal guideways 12 into the trough 40 and flow toward the front side of the machine and downwardly through the aperture or channel 66 into the tray 68. The portion of the machine bed 2 carrying the guideways 4 overhangs the lower portion of the base as above described by an amount sufficient to accommodate the rear edge of the tray 68, being shaped to provide a clearance recess or notch 67 as clearly shown in FIG. 1.

With the machine constructed as described above and shown in the several figures of the drawing, it will be understood that the various types of boring, drilling, milling and other tools will normally be mounted on the horizontal spindle 32 or on a vertical spindle carried by a suitable attachment, such as the vertical milling head or slotter 54, mounted on the side of the spindle head 16 and projecting outwardly a small distance beyond the outer face of the spindle head 16 substantially over the work table 6. The tool shafts will be centered so that they will be located over the center or intermediate portions of the column 14 and machine bed 2 between the guideways 12. In this position the cooling and lubricating fluid will fall into the trough 40 and flow downwardly through the passage 66 into the tray 68.

The various types of cutting tools are mounted on the spindle head 16 to be substantially adjacent to the front surface thereof, as shown in the drawings, in order to provide short sections of the drive shaft or spindle shaft 32 projecting outwardly from the spindle head 16 so as to limit the amount of bending or flexing of the tool shank and drive shaft therefor to a minimum. This obtains precision machining operations on a workpiece mounted on the work table 6 or on the work table 6 in combination with one of the auxiliary table attachments hereinabove described. When horizontal boring operations are to be performed, the work will normally be supported on the top horizontal clamping surface 10 in combination with an auxiliary angle work table 20 carrying an auxiliary rotatable work table where desired, for supporting the work piece so it will overhang the machine bed 2 and the guideways 4 and 12 respectively, as shown in FIG. 4. By mounting the workpiece and the tool for horizontal boring or drilling in this manner on the machine of the present invention, it will be noted that the work stresses applied to the workpiece are transmitted from the workpiece to a rigid work table construction rigidly attached to the machine bed 2 to eliminate relative movement of the workpiece to the machine bed 2 and the spindle 16 for rigidly supporting the workpiece as well as the tool to prevent bending movement of one relative to the other during the machining operations.

Where boring operations are performed by moving the spindle 32 axially with the tool moving away from the spindle head 16, it will be understood that only of the boring operation will be performed on the near side of the workpiece 71. Then the workpiece is rotated through the use of the rotatable auxiliary table attachment to perform the other half of the boring operation without detaching the workpiece from the work table and thereby obtain a boring operation using a relatively short length of the spindle 32 to obtain greater precision in completing a boring operation through the entire length of the workpiece 71.

When vertical boring, drilling, milling or other operations are to be performed on the workpiece 71 with the use of a vertical spindle, such as the vertical head 54 shown in FIG. 2, the application of the cutters carried by head 54 to the workpiece will operate in a downward direction. The workpiece is supported to transmit the force of the cutting action directly to the guideways 4 to substantially eliminate bending stresses in the machine parts and thereby obtain a greater precision of the machining operation on the workpiece.

When milling cutters are used, the cutter may be supported in substantially close adjacent relation to the spindle head 16 for either vertical or horizontal milling operations. The cutter is positioned directly over the upper end of the work table 6 to produce a milling operation on a piece of work supported above the work table 6, as shown in FIG. 4 or on a piece of work, as shown in FIG. 5, supported on the vertical face 8 of the work table 6. This will substantially eliminate bending of the parts of the machine relative to the bed 2 and the cutting tool in obtaining high precision in the machining operations. The rigid construction of the column 14 and its mounting on the machine bed 2 with the spindle head 16 mounted for vertical sliding movement on the front side of the column 14 also produces a cooperation with the machine bed 2 and the work table 6, so the cutting tools can exert their cutting forces in a substantially vertical position over the front edge of the machine bed and over the top of the work table to reduce bending stresses during machining operations of various sorts.

The various types of machining operations, such as boring, drilling, and milling, as well as other suitable operations, may be performed with the machine of the present invention by the operation of the various controls above described. The spindle 32 may be fed in and out of the spindle head 16, the column 14 is moved forwardly and rearwardly on the guideweys 12 relative to the machine bed 2 or a combination of these two movements of the column 14 and the spindle 32 may be used in performing machining operations on work carried by the work table 6 in the various positions described above. The operator of the machine may also operate the spindle head 16 upwardly and downwardly on the column 14 and may also move the spindle head 16 vertically in combination with the movement of the spindle 32 and the column 14 relative to each other and the machine bed 2 in performing machining operations. The work table 6 may also be moved horizontally on the spaced parallel guides 4 back and forth relative to the machine bed 2 and the column 14 in performing machining operations.

Either vertical or horizontal cutting tools carried by the spindle 32 or a vertical spindle, such as shown in connection with the attachment 54 mounted on the spindle head 16, may be used in other machining operations. In each of these operations it will be noted that the movement of the column 14 relative to the machine bed 2 may be obtained to position the cutting tool so it will engage the work in a position substantially over the work table 6 and the end of the machine bed 2 adjacent to the work table 6 for reducing movement of the work and the machine tool relative to each other to a minimum by bending or flexing of the parts of the machine in order to perform substantially accurate precision boring, drilling and milling operations.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. A boring, drilling and milling machine comprising a machine bed formed with side guideways on a substantially vertical surface and top guideways on a substantially horizontal top surface in angular relation to said side guideways, a work table mounted on said machine bed for slidable movement on one of said guideways, a column slidably mounted on said machine bed on the other of said guideways having a guideway extending in angular relation to the guideways on said machine bed, and a spindle head slidably mounted in the guideway on said column.

2. A boring, drilling and milling machine comprising a machine bed having one side wall formed with a pair of vertically spaced parallel horizontal guideways, one above the other, the top wall of said machine bed having a pair of laterally spaced parallel horizontal guideways formed thereon at right angles to the guideways on said side wall, a column slidably mounted on the guideways on said top wall, a work table slidably mounted on the guideways on said side wall and overhanging forwardly therefrom, work supporting means on adjacent outer faces of said work table, a pair of vertical guideways on the side wall of said column facing said work table, a spindle head slidably mounted on the guideways on said column, and tool supporting means mounted on said spindle head.

3. A machine according to claim 2, having a turret head mounted on said column and formed with radial arms adapted to be positioned in alined relation with said spindle head, and means on said arms for detachably mounting tool units and auxiliary tool supporting means, whereby said radial arms may be selectively positioned over said spindle head for positioning a tool carried thereby in position for attachment to and cooperation with said spindle head, and for supporting said tools in remote position to said spindle head.

4. A machine according to claim 2, wherein said work table has a top outer face with the work supporting means thereon located in a horizontal plane above the guideway on the top wall of said machine bed so that machining operations may be performed on all parts of the work mounted on said work table including bottom portions thereof.

5. A machine according to claim 2, wherein said machine bed has the side formed with said vertically spaced side guideways projecting outwardly beyond the portion of said machine bed below said guideways and spaced upwardly from the floor, and a tray mounted below said work table and side guideways for receiving chips and other waste material from the machining operations, said tray being supported from and movable longitudinally with movements of said work table, and being sufficiently elongated in the direction of movement of said work table so that in all longitudinal positions of said work table, a portion of said tray will be beneath the center of the length of said vertically spaced guideways.

6. A machine according to claim 2, wherein said machine bed is formed with a trough between said spaced parallel horizontal guideways on said top wall with the top surface of said machine bed between said guideways, whereby the lower end of said spindle head may have the lower end moved into said trough below said horizontal guideways on the top wall of said bed for machining operations on a work piece down to a position substantially alined with the upper end of said work table.

7. A combined milling, drilling, and boring machine comprising a bed, a work table, a column, and a spindle head, characterized by the fact that said bed is a single integral structure having on its top surface a horizontally extending guideway on which said column is movably mounted, said integral bed structure also having an approximately vertical front face extending approximately perpendicularly to said horizontally extending guideway on the top surface of the bed and having on said front face a horizontally extending guideway on which said work table is movably mounted in an overhanging position projecting forwardly therefrom, and characterized also by the fact that said column has a vertically extending guideway on which said spindle head is movably mounted.

8. A combined milling, drilling, and boring machine comprising a bed, a work table, a column, and a spindle head, characterized by the fact that said bed is a single integral structure having on its top surface a horizontally extending guideway on which said column is movably mounted, said integral bed structure also having winglike parts extending horizontally laterally in general directions perpendicular to said guideway on the top surface, said bed structure having an approximately vertical front face extending continuously across the front of the bed structure including said wing-like parts and having on said front face a horizontally extending guideway including two horizontal rail surfaces vertically spaced from each other, said work table being movably mounted for horizontal travel along said rail surfaces and projecting forwardly therefrom, and characterized also by the fact that said column has a vertically extending guideway on the front side thereof faced toward said work table, said spindle head being movably mounted on said vertically extending guideway.

References Cited by the Examiner

UNITED STATES PATENTS

| | | | |
|---|---|---|---|
| 502,621 | 8/93 | Fox | 90—58.1 |
| 1,690,583 | 11/28 | Jacobson | 90—58.1 |
| 1,940,443 | 12/33 | Blood | 90—16 |
| 2,234,553 | 3/41 | Drummond | 29—972 |
| 2,374,716 | 5/45 | Wiken | 29—972 |
| 2,851,910 | 9/58 | Zwick | 77—4 |

RICHARD H. EANES, JR., *Primary Examiner.*